May 10, 1927.
G. B. JONAS
1,627,780
JOINT BETWEEN METAL AND GLASS AND METHOD OF MAKING THE SAME
Filed April 2, 1926
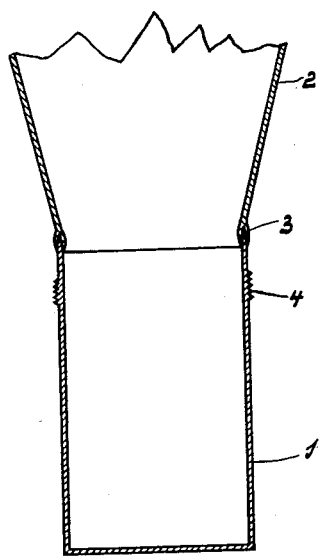
Inventor
G. B. Jonas
by
Langner Parry Card & Langner
Att'ys Patented May 10, 1927.

1,627,780

UNITED STATES PATENT OFFICE.

GOTTFRIED BRUNO JONAS, OF EINDHOVEN, NETHERLANDS, ASSIGNOR TO N. V. PHILIPS' GLOEILAMPENFABRIEKEN, OF EINDHOVEN, NETHERLANDS.

JOINT BETWEEN METAL AND GLASS AND METHOD OF MAKING THE SAME.

Application filed April 2, 1926, Serial No. 99,426, and in the Netherlands May 11, 1925.

This invention relates to an improved sealing of metal in or to glass.

It is known that certain ferro-chromium alloys are very suitable for effecting an airtight seal between metal and glass and offer advantages in this respect over other materials. If, however, the ferro-chromium contains a small percentage of chromium it becomes oxidized to such an extent that some of its favourable properties are destroyed and the effectiveness of the sealing is impaired.

It has now been found that an alloy of iron, chromium and aluminium can be sealed in or to glass and that such an alloy obviates or reduces the oxidation of the iron and chromium while improving the union between the glass and the alloy.

Accordingly the invention consists in sealing or welding an alloy of iron, chromium and aluminium in or to glass.

Glass sealed to the alloy may represent the final product or a metal or other alloy may be joined to the alloy of iron, chromium and aluminium, which is itself sealed in or to glass.

As a general rule the content of aluminium in the alloy need not exceed 5 per cent. Very good results have been obtained even with alloys containing less than 1 per cent of the aluminium. An example of an alloy suitable for the sealing according to this invention consists of 25 per cent of chromium, 0.5 per cent of aluminium and the remainder of iron. The exact composition of the alloy naturally depends on the kind of glass which is to be used. With contents of chromium of less than 25 per cent, it is generally advantageous to increase the contents of aluminium.

The invention can advantageously be used in discharge tubes for affixing the electrodes or other metal members to the glass of the discharge tube and also for sealing or welding metal discs, plates, hoods, rods, wires, etc. in or to glass.

The metal for the discs etc. may be the same alloy as used for the sealing or another metal or alloy united to the iron, chromium and aluminium alloy.

The accompanying drawing shows one way in which the alloy according to the invention may be applied. An anode for electric discharge tubes is represented. The anode 1 consisting of a vessel of an alloy of iron chromium and aluminium is sealed at 3 to a glass vessel 2. At the outer side the wall of the anode is threaded at 4 so that a cooling vessel may be screwed on it.

In the description and claims the term "welding" or "welding an alloy to glass" there is to be understood the joining of the alloy and the glass by heating both of them and bringing them into intimate contact with each other, so that they adhere to each other and remain permanently united.

What I claim is:

1. A method for making a tight joint, comprising, sealing an alloy of iron, chromium, and aluminum, to glass while in a plastic state.

2. A method for making a tight joint, comprising, sealing an alloy of iron, chromium, and not more than 5% of aluminum, to glass while in a plastic state.

3. A method for making a tight joint, comprising, sealing an alloy of about 25% of chromium, 0.5% of aluminum, and the remainder of iron to glass while in a plastic state.

4. An article comprising glass welded to an alloy of iron, chromium and aluminium.

5. An article comprising glass welded to an alloy formed of iron, chromium and not more than 5 per cent of aluminium.

6. An article comprising glass welded to an alloy formed of approximately 25 per cent of chromium, 0.5 per cent of aluminium and the remainder of iron.

7. An article, comprising, glass welded to an alloy of iron, chromium and aluminum and a metal member connected to the alloy.

In testimony whereof I affix my signature, at the city of Eindhoven, this 19th day of March, A. D. 1926.

GOTTFRIED BRUNO JONAS.